United States Patent Office 3,748,168
Patented July 24, 1973

3,748,168
FISHING LINE WITH A CYCLIC SULFONIUM
ZWITTERION-FLUOROCARBON COATING
Donald L. Schmidt and Hugh B. Smith, Midland, Mich.,
assignors to The Dow Chemical Company, Midland,
Mich.
No Drawing. Filed Sept. 22, 1971, Ser. No. 182,895
Int. Cl. A01k 91/00
U.S. Cl. 117—72                                7 Claims

ABSTRACT OF THE DISCLOSURE

Fishing line with a surface coating of a polymer of a water-soluble cyclic sulfonium phenoxide zwitterion (I) containing essentially uniformly dispersed colloidal particles of a fluorocarbon resin has superior handling characteristics and feel coupled with improved resistance to water, solvents, wear and algae pickup.

BACKGROUND

Nylon and polyester lines are widely used by fishermen. For bait casting and spinning, a monofilament line is common. For dry and wet fly fishing, a braided nylon or polyester core is generally preferred for greater strength and flexibility with a top coating of a polyvinyl chloride plastisol to provide additional weight for casting the essentially weightless lure. Further refinements include addition of hollow microspheres to the top coating to increase the buoyance for floating a dry fly line as described by Martuch, U.S. Pat. 3,043, 045. Alternately, Richardson et al., U.S. 3,486,266 describes a wet fly line weighed with glass microspheres. Silicone and fluorocarbon coating have been used to give smoother play plus added buoyancy and water resistance.

Particularly for dry fly casting, which requires considerable skill and accuracy, a flexible and clean line is essential for good "throw" and "laying." Periodic cleaning with special formulations are required to remove build-up of algae and dirt that absorb water, weaken the line, and interfere with its shooting and floating qualities.

STATEMENT OF THE INVENTION

A new fishing line coating has been developed with superior handling characteristics coupled with improved resistance to water, solvents, wear, and algae pickup. The coating is obtained by applying to the fishing line an aqueous coating composition containing as essential elements:

(1) A water-soluble cyclic sulfonium zwitterion monomer of Formula I

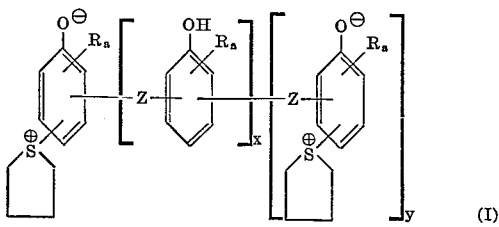

where R is Cl, Br or $C_1$-$C_4$ alkyl and $a$ is 0–2, each tetramethylenesulfonium group is ortho or para to the phenoxide group and $6$ is a bridging group of the formula:

(a) —O($C_mH_{2m}$)O— where $m$ is 1–6 and $\Sigma(x+y)=0$–1, or (b) —$CH_2$— where $\Sigma(x+y)=0$–4; and (2) A colloidal fluorocarbon resin dispersion; and then heating the coated line to obtain a water insoluble polymer coating with the colloidal particles of fluorocarbon resin dispersed essential uniformly throughout the coating.

Advantageously the polymer coating contains about 5–15 weight percent of the fluorocarbon resin dispersed in a polymer matrix obtained from a cyclic sulfonium zwitterion monomer containing an average of about 1.2–2.5 $S^\oplus$/mer. The coating also may contain up to 2 weight percent of a colloidally dispersed high viscosity silicone oil to give added water repellancy, buoyancy and lubricity.

A fishing line with the cyclic sulfonium zwitterion-fluorocarbon coating has enhanced resistance to build-up of algae and dirt and extended life under field conditions because of increased durability and resistance to water, ultraviolet light, insect repellants, skin lotions, gasoline and other solvents commonly encountered in field use.

GENERAL DESCRIPTION (A) CSZ Monomers (I)

To prepare the improved fishing line coating, a cyclic sulfonium zwitterion of Formula I is required. Such cyclic sulfonium zwitterion monomers can be prepared as described in Hatch et al. Belgium Pat. 757,583 and U.S. applications Ser. Nos. 866,762 and 866,763, now U.S. Pats. 3,660,431 and 3,636,052 respectively by reaction of a phenol with a polymethylene sulfoxide and then with base. Although these zwitterion monomers are very soluble in polar hydroxylic solvents such as water and $C_1$-$C_3$ alcohols, they thermally polymerize to give condensation polymers with exceptional water and solvent resistance. Thus, excellent coatings with high solvent resistance are obtained by homopolymerization of a cross-linking CSZ monomer having about 1.2–2.5 sulfonium groups per molecule ($S^\oplus$/mer.) or by copolymerizing such a monomer with a chain extending CSZ monomer, the mixed monomers having an average of about 1.2–2.5 $S^\oplus$/mer.

Particularly suitable herein are the chain-extending monoteramethylenesulfonium zwitterion monomers of phenol (IA), o-cresol (IB), and 2,6-dichlorophenol (IC) and the cross-linking polytetramethylenesulfonium zwitterion monomers of bis(resorcinol)polymethylene ether (ID) and phenol-formaldehyde novolac resins (IE):

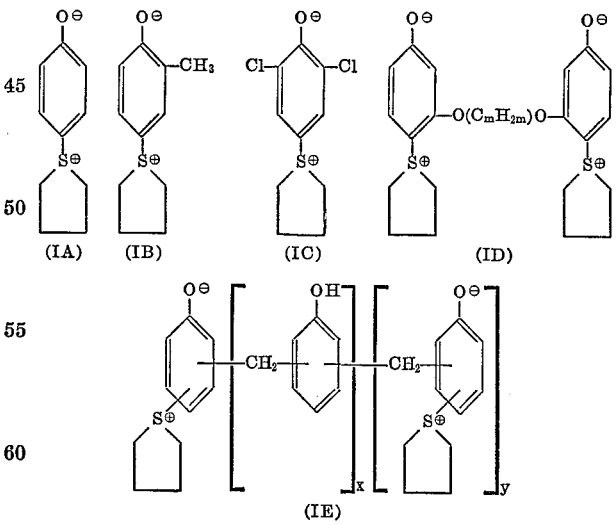

Preferred cross-linking monomers are the bisresorcinol di-, tri- and tetramethylene ether sulfonium zwitterions (ID: $m=2$–4) and the cyclic zwitterion monomers of a water-soluble novolac resin having an average degree of polymerization of about 2–5 and about 1.5–3.0 $S^\oplus$/mer. (IE: $\Sigma(x+y)=1$–4, $y=0.5$–2.0).

The cross-linking monomers ID and IE homopolymerize to give smooth hard coatings with excellent adhesion to solid surfaces and high resistance to strong acids and bases, boiling water, and common organic solvents. Copolymers of the chain-extending and cross-linking CSZ monomers also give smooth hard coatings with the solvent resistance increasing with increasing proportion of the cross-linking monomer.

(B) CSZ-colloidal fluorocarbon resin compositions

In addition to thermal polymerization, the cyclic sulfonium zwitterions are compatible with aqueous alkaline dispersions of colloidal fluorocarbon resins. Thus, aqueous colloidal dispersions of water-insoluble fluorocarbon resins can be blended with a CSZ monomer to give an aqueous composition that can be applied to a fishing line, dried and cured by heating to give a water and solvent resistant coating with the colloidal resin particles dispersed essentially uniformly throughout the CSZ polymer.

Typical of the fluorocarbon resins useful herein are the tetrafluoroethylene polymers and copolymers of Plunkett U.S. Pat. 2,230,654, Berry U.S. 2,559,750, Renfrew U.S. 2,534,058, and Roberts U.S. 3,063,922. Also, water-insoluble organic liquids such as the tetrafluoroethylene telomers of Skehan U.S. 3,505,229, the perfluoropropylene oxide polymers and derivatives of Milian U.S. 3,214,478, Miller U.S. 3,242,218 and Selman U.S. 3,274,239 in aquasol form can be used. Particularly suitable are commercial dispersions of fluorocarbon resins having a particle size of about 5–500 millimicrons ($m\mu$).

In practice the cyclic sulfonium zwitterion-colloidal fluorocarbon resin coating compositions are conveniently prepared by blending an aqueous resin sol and an aqueous or aqueous $C_1$–$C_3$ alcohol solution of the CSZ monomer. The coating composition preferably contains about 5–15 wt. percent fluorocarbon resin and 83–95 wt. percent CSZ monomer based on total solids. Particularly suitable for a durable fishing line coating is a mixture of (A) about 25–47 wt. percent of the o-cresol monomer IB and 70–48 wt. percent of the bis(resorcinol)ether monomer ID or novolac monomer IE, (B) about 5–15 wt. percent of a colloidal fluorocarbon resin having a particle size of about 5–500 $m\mu$, and (C) about 0–2 wt. percent of a high viscosity silicone fluid having a particle size less than about 500 $m\mu$.

The small amount of silicone fluid is added to improve the water resistance and buoyancy of the coated lines. Typical is an emulsified 100,000 cs. polydimethylsiloxane (Dow Corning HV-490 Emulsion). Conventional thickeners, compatible pigments, dyes, leveling agents, etc. can also be incorporated if desired for specific applications.

(C) Coating process

The aqueous CSZ-fluorocarbon resin compositions are applied to the fishing lines by spraying, dipping, roll coating, or other conventional means. Particularly suitable is dip coating in an aqueous CSZ-fluorocarbon resin mixture containing about 5–25 wt. percent total nonvolatile material. Advantageously the aqueous coating mixture also contains about 10–40 wt. percent of a $C_1$–$C_3$ alcohol to clean and wet the line.

The treated line is then heated at about 40°–200° C., preferably about 90°–150° C., to volatilize the aqueous solvent and convert the monomer irreversibly into the water and solvent resistant coating containing the dispersed fluorocarbon resin particles. A suitable coating thickness of about 0.1–0.5 mil can be obtained in a single pass of a continuous line using an aqueous CSZ-fluorocarbon resin composition containing about 10–25 wt. percent total solids and a cure time of about 1–3 minutes at 120° C. The resulting smooth CSZ-fluorocarbon coating adheres tenaciously to nylon and polyester lines with or without a prior coating of polyvinyl chloride or other resin.

To illustrate further the present invention, the following examples are given. Unless otherwise stated, all parts and percentages are by weight.

EXAMPLE 1

Cyclic sulfonium zwitterionic monomers (CSZ–I)

(A) A solution of 38.5 parts (0.15 mole) biscatechol trimethylene ether and 34.4 parts (0.33 mole) tetrahydrothiophene oxide in about 160 parts methanol was treated at 0° C. with anhydrous HCl. The solid bissulfonium chloride was recovered, dissolved in methanol and slurried with a strong base anion-exchange resin in hydroxide form to give the cyclic sulfonium zwitterionic monomer (ID, $m=3$). The CSZ monomer can be isolated or used as a methanol or aqueous methanol solution. In aqueous solution it has a pH of about 10.5–11.5.

(B) Other CSZ monomers of Formula I are prepared similarly from phenol, bisresorcinol ethers, and phenol-formaldehyde novolac resins. A water soluble phenol or polyphenol is normally required for CSZ monomers to be used in an aqueous coating system.

EXAMPLE 2

CSZ-fluorocarbon coating compositions (A) Typically 0.7 part of CSZ–ID–4, the bisresorcinol tetramethylene ether bissulfonium monomer of the formula:

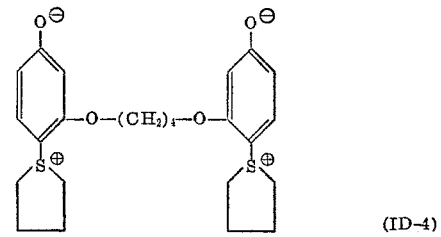

(ID-4)

in 1.3 parts methanol was added to 1 part water and 1 part of a commercial fluorocarbon resin dispersion containing about 60% 50–500 $m\mu$ resin particles in aqueous dispersion at a pH of about 10 (Du Pont "Teflon" 30 TFE resin dispersion). Blending gave a stable CSZ Teflon sol. Applied to a steel test panel and cured at 85° C. (15 min.), the mixture gave a smooth coating with a Kentron-Knoop hardness of 5.6 (1 ml). The fluorocarbon resin was dispersed essentially uniformly throughout the polymerized CSZ.

(B) A coating of 90% CSZ–ID–4 or CSZ–ID–2 and 10% colloidal polytetrafluoroethylene prepared as in 2A had a coefficient of friction of 0.10–0.11 compared with 0.15 for nylon. In a test on a Tabor Abrader Test with a 1000 g. ball, the 90% CSZ–10% Teflon coating lost only 2.0 mg./1000 revolutions while a nylon coating lost 5.4 mg.

The polymerized CSZ are effective binders not only for neutral or basic colloidal sols of solid fluorocarbon resins, but also for colloidally dispersed liquids and waxes including silicone oil, petroleum waxes, etc.

EXAMPLE 3

Coated fly line (A) A commercial braided nylon fly line having a tapered coating of polyvinyl chloride plastisol was dip coated in a CSZ-fluorocarbon composition containing 18 parts CSZ–ID–2 and 22 parts CSZ–IB in 92.5 parts of 40% aqueous methanol blended with 6 parts of a fluorocarbon resin dispersion containing 60% resin solids (Du Pont "Teflon" 30 TFE resin dispersion). The coated line was cured by passing through a 10 ft. 120° C. oven at a rate of about 2–8 ft./min. The minimum curing time of 1.5 minutes gave complete drying and cure for a final CSZ-fluorocarbon resin coating thickness of 0.5 mil.

(B) In another experiment, a similar tapered fly line was coated with the CSZ-fluorocarbon composition of Example 3A containing an additional 2 parts of a 100,000 cs. polydimethylsiloxane emulsion (Dow Corning HV 490 Emulsion, 35% solids in water).

(C) In other tests, water-soluble polymeric thickeners including methyl cellulose, the ammonium salt of a styrene-maleic anhydride copolymer, and an ethylene-acrylic acid copolymer salt were used as optional additives to control the viscosity of the coating composition for the continuous dip coating machine. Minor amounts of pigment, coloring agents, and leveling agents can also be used if desired.

(D) Coated casting fly lines prepared as described in Examples 3A-C were tested by experienced fishermen who noted superior "throw" and "shoot" coupled with easier lift from water as well as greater resistance to water, solvents, and algae pickup.

We claim:
1. A fishing line with a water and solvent resistant surface coating prepared by:
(A) coating the fishing line with an aqueous composition containing as essential elements
(1) a water-soluble cyclic sulfonium zwitterion monomer of Formula I:

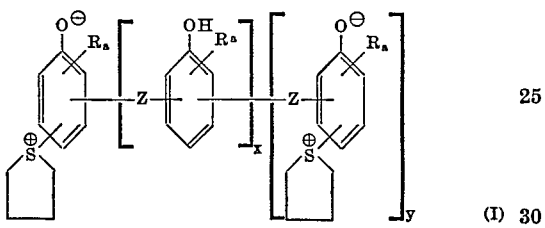

where
R is Cl, Br, or $C_1$-$C_4$ alkyl and $a$ is 0-2, each tetramethylenesulfonium group is ortho or para to the phenoxide group, and
Z is a bridging group of the formula:
(a) —O($C_mH_{2m}$)O— where $m$ is 1-6 and $\Sigma(x+y)=0-1$, or
(b) —$CH_2$— where $\Sigma(x+y)=0-4$; and
(2) about 5-15 weight percent, based on total solids, of an aqueous colloidal fluorocarbon resin dispersion; and
(B) heating the coated line to obtain a water insoluble polymer coating with the colloidal particles of fluorocarbon resin dispersed essentially uniformly throughout the coating.

2. The fishing line of claim 1 where the coating is a polymer of a cyclic sulfonium zwitterion of Formula I having an average of at least 1.2 sulfonium groups per molecule.

3. The fishing line of claim 1 where the polymer coating is a copolymer of about 30-50 wt. percent of the cyclic sulfonium zwitterion monomer from o-cresol, and about 50-70 wt. percent of the cyclic sulfonium zwitterion monomer from bisresorcinol polymethylene ether:

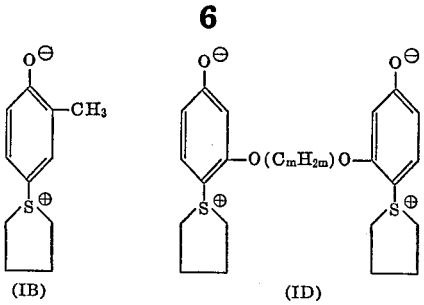

4. The fishing line of claim 1 where the colloidal fluorocarbon resin is an aqueous alkaline dispersion of 50-500 m$\mu$ fluorocarbon resin particles.

5. The fishing line of claim 1 where the coating composition is dried and cured by heating at about 90°-150° C.

6. The fishing line of claim 1 where the sulfonium polymer coating is a top coating with a thickness of about 0.1-0.5 mil.

7. The fishing line of claim 1 having a nylon or polyester core, a coating of a polyvinyl chloride plastisol, and a top-coating prepared by:
(A) dip coating the line with an aqueous coating composition containing about 5-25 wt. percent solids consisting essentially of
(1) about 25-47 wt. percent of the cyclic sulfonium zwitterion monomer from o-cresol,
(2) about 70-48 wt. percent of the cyclic sulfonium zwitterion monomer from bisresorcinol polymethylene ether,
(3) about 5-15 wt. percent of a 50-500 m$\mu$ colloidal fluorocarbon resin, and
(4) about 0-2 wt. percent of a high viscosity polydimethylsiloxane having an emulsion particle size less than about 500 m$\mu$, and
(B) curing the coating at about 90°-150° C. to obtain a water insoluble top coating with a thickness of about 0.1-0.5 mil.

References Cited

UNITED STATES PATENTS

| | | | |
|---|---|---|---|
| 3,043,045 | 7/1962 | Martuch | 43—44.98 |
| 3,486,266 | 12/1969 | Richardson et al. | 43—44.98 |
| 3,512,294 | 5/1970 | Howald | 43—44.98 |
| 3,523,034 | 8/1970 | Howald | 117—76 T |
| 3,636,052 | 1/1972 | Hatch et al. | 260—332.3 R |
| 3,395,530 | 8/1968 | Campbell | 106—15 A F X |

RALPH HUSACK, Primary Examiner

U.S. Cl. X.R.

43—44.98; 117—76 T, 138.8 N, F, 161 UH, VF, R; 260—29.6 F, 900

UNITED STATES PATENT OFFICE
CERTIFICATE OF CORRECTION

Patent No. 3,748,168              Dated July 24, 1973

Inventor(s) Donald L. Schmidt and Hugh B. Smith

It is certified that error appears in the above-identified patent and that said Letters Patent are hereby corrected as shown below:

Col. 1, line 62, "6" should be --Z--.

Col. 5, line 53, after "cresol" add --, IB,--.

Col. 5, line 56, after "polymethylene ether" add --ID, wherein m = 2-4,--.

Col. 6, line 32, after "polymethylene ether" add --ID, m = 2-4,--.

Signed and sealed this 1st day of January 1974.

(SEAL)
Attest:

EDWARD M. FLETCHER, JR.                RENE D. TEGTMEYER
Attesting Officer                      Acting Commissioner of Patents